United States Patent
Gomes Pereira et al.

(10) Patent No.: US 11,449,379 B2
(45) Date of Patent: Sep. 20, 2022

(54) ROOT CAUSE AND PREDICTIVE ANALYSES FOR TECHNICAL ISSUES OF A COMPUTING ENVIRONMENT

(71) Applicant: KYNDRYL, INC., New York, NY (US)

(72) Inventors: Edson Gomes Pereira, São Paulo (BR); Alexandre Baltar, São Paulo (BR); Thiago C. Rotta, São Paulo (BR); Rodrigo Candido Leme, Brazil (BR)

(73) Assignee: Kyndryl, Inc., New York, NY (US)

( * ) Notice: Subject to any disclaimer, the term of this patent is extended or adjusted under 35 U.S.C. 154(b) by 1170 days.

(21) Appl. No.: 15/975,259

(22) Filed: May 9, 2018

(65) Prior Publication Data

US 2019/0347148 A1 Nov. 14, 2019

(51) Int. Cl.
*G06F 11/07* (2006.01)
*G06F 11/34* (2006.01)
*G06K 9/62* (2022.01)
*G06N 20/00* (2019.01)

(52) U.S. Cl.
CPC ........ *G06F 11/079* (2013.01); *G06F 11/3466* (2013.01); *G06K 9/623* (2013.01); *G06K 9/6267* (2013.01); *G06N 20/00* (2019.01)

(58) Field of Classification Search
CPC .............. G06F 11/079; G06F 11/3466; G06F 11/3409; G06F 11/3447; G06F 2201/86; G06F 11/008; G06F 11/3006; G06K 9/623; G06K 9/6267; G06N 20/00; G06Q 10/06375
See application file for complete search history.

(56) References Cited

U.S. PATENT DOCUMENTS

| | | |
|---|---|---|
| 6,738,933 B2 | 5/2004 | Fraenkel et al. |
| 8,594,977 B2 | 11/2013 | Laberge et al. |
| 8,776,241 B2 | 7/2014 | Zaitsev |
| 8,839,036 B2 | 9/2014 | Rymeski et al. |
| 9,015,194 B2 | 4/2015 | Ziv et al. |

(Continued)

OTHER PUBLICATIONS

Anonymous, "A knowledge based problem diagnosis apparatus through machine learning", IP.com Electronic Publication Date: May 19, 2016, 10 pgs.

(Continued)

*Primary Examiner* — Michael A Keller
(74) *Attorney, Agent, or Firm* — Erik Swanson; Matthew M. Hullhan; Heslin Rothenberg Farley & Mesiti PC

(57) ABSTRACT

A process collects information about multiple systems of a computing environment from environmental tools web sources. The process builds and trains a classification model that extracts relevant information that classifies technical issues of the computing environment. The process performs root cause and predictive analyses, and identifies root causes of experienced technical issues and predicted technical issues. Based on identifying the root causes of the experienced technical issues, or identifying predicted issues, the process provides suggested corrective actions or optimization actions. Effectiveness of the suggested corrective actions and suggested optimization actions is tracked, and results of the tracking are fed into a training process that further trains the classification model.

20 Claims, 7 Drawing Sheets

(56) References Cited

U.S. PATENT DOCUMENTS

| | | | |
|---|---|---|---|
| 9,104,572 B1 | 8/2015 | Thompson et al. | |
| 9,189,317 B1 | 11/2015 | Marimuthu | |
| 9,317,829 B2 | 4/2016 | Anand et al. | |
| 9,497,072 B2 | 11/2016 | Gates et al. | |
| 2007/0016831 A1* | 1/2007 | Gehman | G06F 11/079 |
| | | | 714/E11.131 |
| 2011/0231704 A1 | 9/2011 | Ge et al. | |
| 2015/0039745 A1* | 2/2015 | Degioanni | G06F 11/3495 |
| | | | 709/224 |
| 2019/0095265 A1* | 3/2019 | Dome | G06F 11/3419 |

OTHER PUBLICATIONS

Rodrigues de Carvalho, T., "Root Cause Analysis in Large and Complex Networks", http://repositorio.ul.pt/bitstream/10451/1204/1/17917_ULFC086685_TM.pdf, Dec. 2008, 66 pgs.

Mell, Peter, et al., "The NIST Definition of Cloud Computing", NIST Special Publication 800-145, Sep. 2011, Gaithersburg, MD, 7 pgs.

* cited by examiner

ROOT CAUSE AND PREDICTIVE ANALYSES FOR TECHNICAL ISSUES OF A COMPUTING ENVIRONMENT

BACKGROUND

Technical issues frequently occur with servers and other systems in a large information technology environment. This affects standard process execution and negatively impacts the underlying business, resulting in significant damage to the business's reputation and lost revenue. Technical issues may be identified and fixed by members of a technical team, but regular incident management procedures focus primarily on finding a fast resolution, even if temporary, to triage the situation. In order to identify the root cause of such incidents, many labor hours are spent parsing messages, errors, logs, and various forms of documentation available. This process is often expensive, time consuming, and involves a significant number of people at different levels of the team support hierarchy. It also may fail to properly identify the root cause of the technical issue. Consequently, the expenditure of resources in these situations is very high.

SUMMARY

Shortcomings of the prior art are overcome and additional advantages are provided through the provision of a computer-implemented method. The method collects information about multiple systems of a computing environment, the collected information including information from environmental tools of the computing environment and information from web sources. The method builds and trains, via machine learning, a classification model that extracts from the collected information, in part based on natural language processing of at least a portion of the collected information, relevant information that classifies technical issues of the computing environment. The process performs root cause analysis using the classification model and identifies root causes of experienced technical issues experienced by the multiple systems. The root cause analysis uses the classification model to extract relevant information, of the collected information, about the experienced technical issues and determine the root causes of the experienced technical issues based on correlations to prior-identified technical issues. Based on identifying the root causes of the experienced technical issues, the process provides suggested corrective actions to perform against at least one system, of the multiple systems, to which the experienced technical issues relate. The corrective actions are selected by the classification model to target and correctively address the identified root causes of the experienced technical issues. The process also performs predictive analysis using the classification model and identifies predicted technical issues that are not occurring at a current time but are expected to occur in the computing environment in the future based on current states of the multiple systems. Based on identifying the predicted technical issues, the process provides suggested optimization actions to perform against at least one system, of the multiple systems, to which the predicted technical issues relate. The suggested optimization actions are selected by the classification model based on identifying past actions, and effectiveness thereof, taken to prevent issues in the computing environment, and the suggested optimization actions are for preventative optimization to prevent experiencing the predicted technical issues. The process tracks effectiveness of the suggested corrective actions in correcting the root causes of the experienced technical issues and of the suggested optimization actions in preventing the predicted technical issues, and feeds the results of the tracking into a training process that further trains the classification model.

Further, a computer system is provided that includes a memory and a processing circuit in communication with the memory, wherein the computer system is configured to perform a method. The method collects information about multiple systems of a computing environment, the collected information including information from environmental tools of the computing environment and information from web sources. The method builds and trains, via machine learning, a classification model that extracts from the collected information, in part based on natural language processing of at least a portion of the collected information, relevant information that classifies technical issues of the computing environment. The process performs root cause analysis using the classification model and identifies root causes of experienced technical issues experienced by the multiple systems. The root cause analysis uses the classification model to extract relevant information, of the collected information, about the experienced technical issues and determine the root causes of the experienced technical issues based on correlations to prior-identified technical issues. Based on identifying the root causes of the experienced technical issues, the process provides suggested corrective actions to perform against at least one system, of the multiple systems, to which the experienced technical issues relate. The corrective actions are selected by the classification model to target and correctively address the identified root causes of the experienced technical issues. The process also performs predictive analysis using the classification model and identifies predicted technical issues that are not occurring at a current time but are expected to occur in the computing environment in the future based on current states of the multiple systems. Based on identifying the predicted technical issues, the process provides suggested optimization actions to perform against at least one system, of the multiple systems, to which the predicted technical issues relate. The suggested optimization actions are selected by the classification model based on identifying past actions, and effectiveness thereof, taken to prevent issues in the computing environment, and the suggested optimization actions are for preventative optimization to prevent experiencing the predicted technical issues. The process tracks effectiveness of the suggested corrective actions in correcting the root causes of the experienced technical issues and of the suggested optimization actions in preventing the predicted technical issues, and feeds the results of the tracking into a training process that further trains the classification model.

Yet further, a computer program product including a computer readable storage medium readable by a processor and storing instructions for execution by the processor is provided for performing a method. The method collects information about multiple systems of a computing environment, the collected information including information from environmental tools of the computing environment and information from web sources. The method builds and trains, via machine learning, a classification model that extracts from the collected information, in part based on natural language processing of at least a portion of the collected information, relevant information that classifies technical issues of the computing environment. The process performs root cause analysis using the classification model and identifies root causes of experienced technical issues experienced by the multiple systems. The root cause analysis uses the classification model to extract relevant information, of the collected information, about the experienced technical issues and determine the root causes of the experienced technical issues based on correlations to prior-identified technical issues. Based on identifying the root causes of the experienced technical issues, the process provides suggested corrective actions to perform against at least one system, of the multiple systems, to which the experienced technical issues relate. The corrective actions are selected by the classification model to target and correctively address the identified root causes of the experienced technical issues. The process also performs predictive analysis using the classification model and identifies predicted technical issues that are not occurring at a current time but are expected to occur in the computing environment in the future based on current states of the multiple systems. Based on identifying the predicted technical issues, the process provides suggested optimization actions to perform against at least one system, of the multiple systems, to which the predicted technical issues relate. The suggested optimization actions are selected by the classification model based on identifying past actions, and effectiveness thereof, taken to prevent issues in the computing environment, and the suggested optimization actions are for preventative optimization to prevent experiencing the predicted technical issues. The process tracks effectiveness of the suggested corrective actions in correcting the root causes of the experienced technical issues and of the suggested optimization actions in preventing the predicted technical issues, and feeds the results of the tracking into a training process that further trains the classification model.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
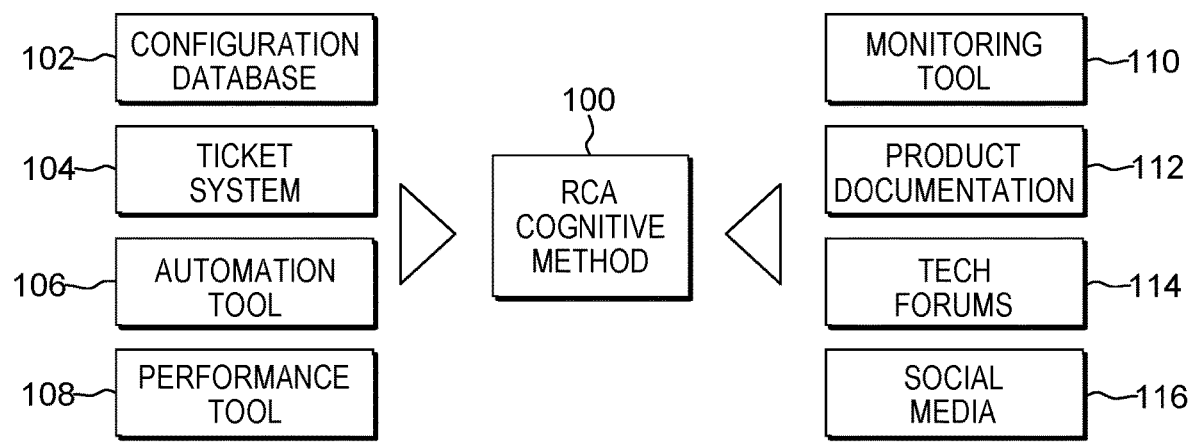
FIG. 1 depicts an example system context showing sources of data provided to a root cause analysis cognitive method, in accordance with aspects described herein.

Described herein are approaches for determining root cause analysis (RCA) of experienced technical issues, together with predictive analysis for the identification of predicted technical issues. Aspects can leverage natural language processing of collected information to help interpret the information for use in cognitive root cause and predictive analyses, decision support, and suggested optimization actions.

When experiencing a technical issue in a computing environment, particularly one supporting critical processes, the initial focus is usually to implement immediate actions that remedy or triage the situation. These may be work-around/temporary remedies since the real cause of the technical issue (termed the "root cause") may be very difficult to identify. Unfortunately, it is often necessary to identify the root cause of a technical issue in order to determine the best approach for preventing that technical issue from occurring in the future. Root cause determination for technical issues is important for the overall health of the computing environment and its individual components. Additionally, identification of a root cause may enable the identification of the factors contributing to that cause. These factors can be applied to observed states of the computing environment or other computing environments in order to predictively assess whether the same technical issue is expected to occur. If so, possible suggested optimization actions (ones designed to avoid experiencing the technical issue that has been predicted to occur) can be identified and implemented.

RCA may be important to determining short-term strategy (tactical action) to remediate a technical issue, and thus reducing its impact and potentially preventing the risk of experiencing the same situation again. A final or more thorough diagnosis of the root cause can also involve a long-term strategy (strategic action) to provide overall optimization of the systems, applications, and infrastructure of the computing environment, helping information technology (IT) executives determine where to invest more resources.

Aspects described herein provide approaches that collect and analyze structured and unstructured information from multiple systems, for example ticketing systems, monitoring tools, performance tools, and others, along with any other relevant knowledge/database information such as product documentation and manuals, publications, technical papers and presentations, public data in the form of contributions to product forums and social media posts, as examples. Information extracted about an experienced or on-going technical issue, such as a specific problem with particular system(s) of the environment, is compared to a set of information about related and/or similar issues and instructions/actions that resolved, or may have resolved, those similar issues in the past. A system collects this information and correlates it to historical problems/solutions to identify similarities with past incidents and potential resolutive actions to those past incidents. These aspects may be performed by an autonomous process to relatively quickly (in comparison to traditional approaches) identify the root cause of a technical issue and help define a strategy to optimize actions that fix the technical issue and prevent the same or similar issues from later occurring in the IT environment. In some approaches, outside information, such as passages from product manuals or online resources, is retrieved to support and possibly accelerate the process of resolving the technical issue.

More particularly, in some approaches, a process implements a machine learning capability including a model trained using machine learning techniques against prior/past data. Past issue/solution combinations may be ranked based on relevancy to a current context (i.e. the context in which a current technical issue is experienced), and feedback can be presented by users to indicate whether or not a solution resolved the issue. Based on this feedback, aspects may re-rank the potential solutions and continuously learn based on past experiences as the process is fed with further information over time.

Aspects of a cognitive method can also identify past actions taken that have been confirmed to prevent re-incidence of an experienced technical issue. Effectiveness of actions taken in an attempt to correct an issue may be assessed in any desired manner, for instance by looking at logs or other system information. This can also inform proactive optimization actions to prevent re-incidence and/or optimize the systems to prevent re-incidence. For instance, preconditions (high disk usage, high memory usage, etc.) shown to have a statistically significant correlation to an experienced issue can be identified. These can be compared to the current states of systems to flag situations when the issue is expected to reoccur. Optimization actions may be suggested and implemented before the critical threshold (when the technical issue is actually experienced) is reached, and thus prevent the issue from occurring.

In some aspects, collected data, such a system logs and events delivered from monitoring tools, product documentation, and user contributions to public web sources, as examples, is processed by a natural language classifier to understand practical meanings of those inputs and translate them into structured data for a database. Prior RCA documentation can also be analyzed. Machine learning techniques are applied to extract the relevant information about an ongoing or unresolved technical issue and correlate the relevant information to that of known/prior problems. This can minimize time and other resources spent diagnosing the issue and searching for a proper solution. An RCA cognitive method described herein learns and improves over time, potentially with little or no administrator interaction, to suggest effective actions to apply to the relevant systems of the environment both to identify and correct root causes of technical issues, and identify actions for optimizing systems to avoid technical issues that are predicted to occur.

Additionally, aspects can leverage automation tools of the environment to create and perform automated tasks based on the results of the RCA and predictive analyses, thereby providing automatic corrective actions to fix and/or prevent technical issues.

Accordingly, described herein are processes to rapidly check data from different sources, generate hypotheses and compare these with existing or known technical issues, and provide suggested corrective or preventative actions with high probability of effectiveness.

FIG. 1 depicts an example system context showing sources of data provided to a root cause analysis cognitive method 100, in accordance with aspects described herein.

Configuration database 102 provides access to the asset baselines, specifically information about assets (platforms, products installed, versions, capacity, etc.) and their configurations.

Ticket system or tool 104 is a problem/incident management system that records information about technical issues including the assets, resources, and applications involved, the severity, descriptions, and so on.

Automation tool 106 is used to implement some level of automation tasks to be performed in the system, such as backups, application fixes/patches, and preventative measures, as examples. In some embodiments, this is leveraged to automatically implement actions recommended from the RCA cognitive method as described herein.

Performance tool 108 collects performance data for assets in the environment, providing reports of capacity usage, for instance.

Monitoring tool 110 collects events (including errors and other logged items) raised in/by the environment assets. This information may be collected from agents installed in the assets, for instance.

Product documentation 112 is collected from providers of products/assets (including hardware, software, and other solutions). This documentation typically contains technical specifications, configuration parameters, and troubleshooting information, among other information.

Information from tech forums 114 can provide useful information, such as best practices documentation, reports of unknown issues, and proposed solutions and workarounds adopted for different issues, as examples.

Social media 116 can identify current or newly discovered problems, such as a newly discovered vulnerability or malicious attack that is currently underway.

Figure 2:
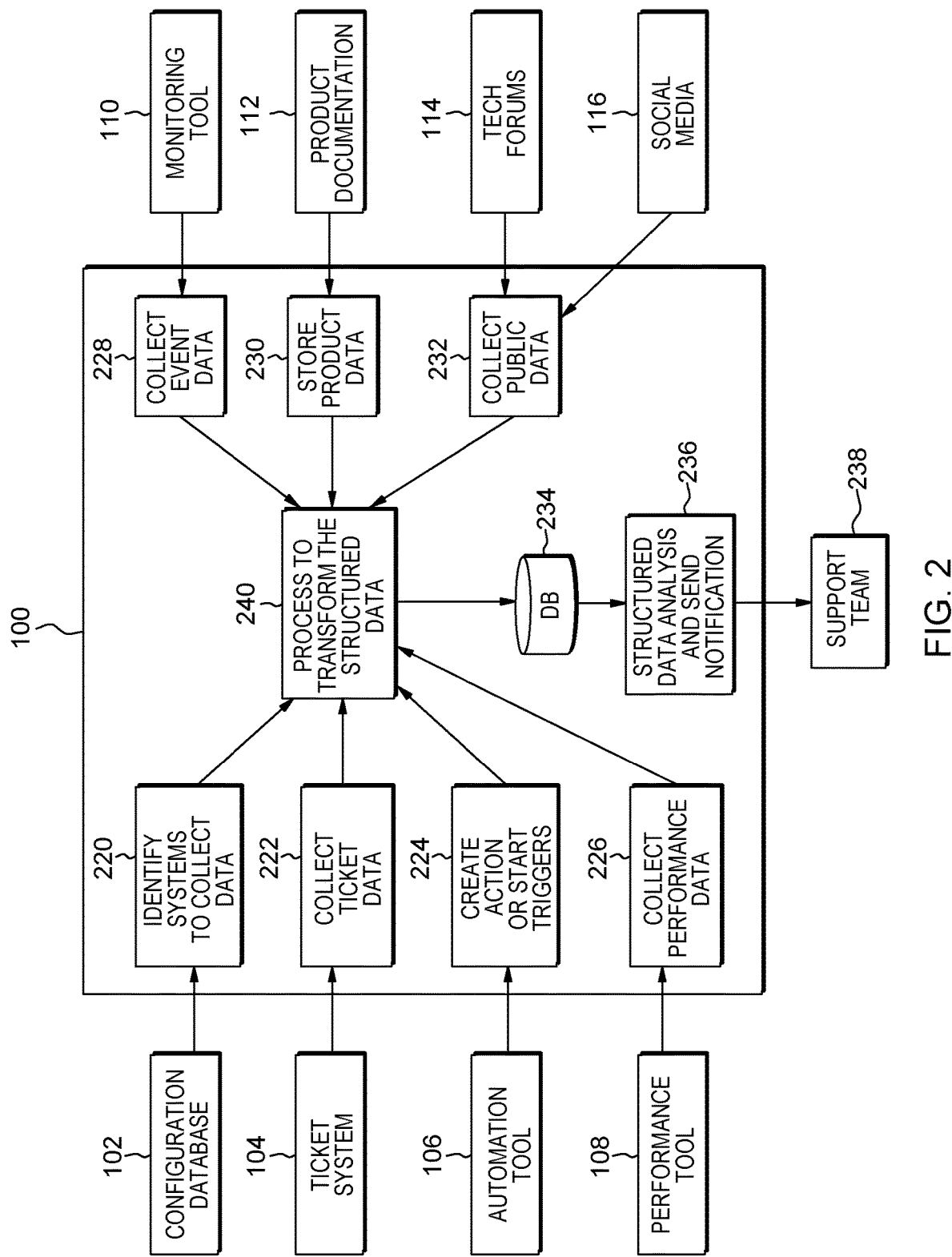
FIG. 2 provides further details of the root cause analysis cognitive method of FIG. 1, in accordance with aspects described herein.

The RCA cognitive method 100 leverages some or all of the above information. FIG. 2 provides further details of this RCA cognitive method of FIG. 1, in accordance with aspects described herein.

A function of the cognitive method 100 may be to collect and filter/transform data into usable a form. As an example, collected system logs from an operating system may include a lot of extraneous information that is not useful to the cognitive method. The data can be filtered and transformed into any desired structure for the cognitive method.

In some embodiments, aspects of the cognitive method 100 of FIG. 2 are executed/performed by a single computer system, though aspects could instead be distributed to several computer systems, perhaps not co-located, if desired. For instance, database 234, which may be extremely large, may be housed at a dedicated storage facility while the structured data analysis 236 may be performed by a cloud processing facility. Other possible configurations are immediately recognizable.

Identify Systems to Collect Data (220): This function interacts with the configuration database 102 to collect asset and system information about the baseline of the environment. The collected confirmation information may be used to establish the overall description for the computing environment and the relationship with business applications. The data collected can be filtered to identify the main data field(s) to be used, such as those indicating Hardware Platform, Operating System, Software and components installed, Versioning, Network data, and so on. A configuration management database typically contains a lot of information about the configuration of each asset. Some of this information may not be useful to the cognitive method. The serial number assigned to an electronics rack, for example, likely has no bearing on any technical issues experienced with the assets positioned in that rack.

Collect Ticket Data (222): This function collects and filters incident tickets from the ticket system 104. The tickets are created to provide important data to the method to identify the criticality, assets and products involved, and any other resources. Ticket data can be correlated to asset information to obtain a better understanding of what specific technology is involved in an experienced technical issue. The ticket system 104 can use the configuration management database 102 to identify assets involved in the ticketed issue. The ticket information is correlated to the (updated and accurate) information from the configuration database 102. Sometimes, for instance if the ticket is old, the version or other information about an asset has changed or the asset is no longer part of the environment. An open ticket might indicate an issue with a database running software version 1.2, but that database may now run software version 1.5. The cognitive method in this example can compare the current version identified from the configuration database with the version indicated in the ticket, to identify the current properties of the assets involved in the ticket.

Create Action or Start Triggers (224): This function interacts with an existing automation tool 106 to define tasks and/or to initiate some programmed tasks to take measures to alert and/or fix the environment.

Collect Performance Data (226): This function works with the performance tool 108 to collect regular performance reports for the assets in the environment. This information can be used to predict and/or to demonstrate capacity utilization in any relevant circumstances.

Collect Event Data (228): Agents of the monitoring tool 110 can collect events generated in the systems, according to the products installed, and also collect logs and error messages, as examples. This information can be used to compare the events and circumstances surrounding a current or predicted technical issue, and can be compared with product information and other data from different sources to identify specific failure(s) in specific component(s).

Store Product Data (230): Each product and service provider can offer documents and technical specifications for the systems and products they provide, as well parameters to be configured, minimum resources to be used, etc. This product documentation 112 can be used as a base to evaluate the current system configuration and identify possible mistakes or deviations from best practices.

Collect Public Data (232): Tech forums 114 can be monitored, and the content presented thereon by the technical community can be compared against collected information to look for similar situations and experiences. This can be very useful when others face the same technical issues and post about new conceptual solutions to potentially establish a new best practice. Social media 116 can provide real-time input for current events, for instance the discovery or onset of a new vulnerability, virus attack or malicious intervention, as examples.

Process to Transform the Data (240): This component receives input data with the information from, e.g., sources 220, 222, 224, 226, 228, 230 and 232, that can help identify actual or potential technical issues, and resolutive/preventative actions for those issues based on an analysis of the retrieved data. Once the data is initially obtained, it may be filtered/transformed to any desired format, structure, or the like, and stored in the source knowledgebase (KB) 234, which may include one or more databases of structured or semi-structured data/information. In some embodiments, natural language processing is applied to collected information (for instance at least the product documentation and forum/social media information) to extract the knowledge and experience detailed by those online sources.

Structured Data Analysis and Send Notification (236): This component provides, as examples, (i) ranking of relevant information that may serve as a response to a technical issue based upon the identified parameters, (ii) determining a response to a user as the root cause for the incident, and (iii) further actions that can be taken to fix the issues. Accordingly, the structured data analysis accesses a collection of candidate solutions and ranks those solutions. The solutions can be correlated to the issues they are applied to, to form issue-solution combinations. It compares the current situation (indicated by the collected data) against the information from previous incidents, the documentation, and other collected information. Based on this, it compares or ranks solutions and determines the best solution documented for the situation. It can present to a support team 238 recommended actions to perform to address the issue. In cases where a confidence that the top-ranked solution is below some confidence threshold, the method can refrain from recommending the actions to implement that solution, or could recommend but refrain from automatically implementing those actions. This may be particularly applicable if the experienced technical issue is a newly identified issue, solutions to which have not been fully tested. With regard to automated implementation of actions, the method could automatically (using automation tools or other tools) implement recommended actions absent involvement of a user. Such actions could be any actions performed by or on assets of the environment, for instance actions to set configuration settings or perform specific activities using those assets, as examples.

The cognitive method encompasses machine learning that builds and trains a classification model that extracts, from collected information, the relevant information that classifies technical issues. The model may be trained from prior data about technical issues having identified or proposed solutions. A process can initiate an RCA leveraging the classification model to identify the root cause after the incident is initially addressed by some emergency remediation. In cases where the root cause of the technical issue remains unknown, a new policy may be created to track the issue for root cause determination and begin logging problem/solution combinations that might potentially resolve the issue.

An example scenario is now presented in which a technical issue arises during regular business hours, the time to recovery is very small (<90 minutes), and the business impact of the technical issue while it remains unresolved is high. In situations such as this, the support team is not afforded time to figure out the root cause of the technical issue because the initial focus is to perform a workaround, invoke a contingency plan, or implement a temporarily fix to re-establish the environment in order to minimize the immediate impact to the business.

In this example scenario, a server runs enterprise software, such as Application and Integration Middleware version 18.0.2. The server faces technical issues with an instance of a queue manager component referred to as Queue Manager. Specifically, the instance repeatedly crashes during normal operation, resulting in an incident ticket severity 1 (highest) on the basis that the component is used by a critical financial application. During business hours, the support team can only perform the temporary fix of restarting the Queue Manager; the issue is likely to keep repeating until the root cause is identified and appropriate actions, determined based on identifying the root cause, are applied to fix the technical issue.

Figure 3:
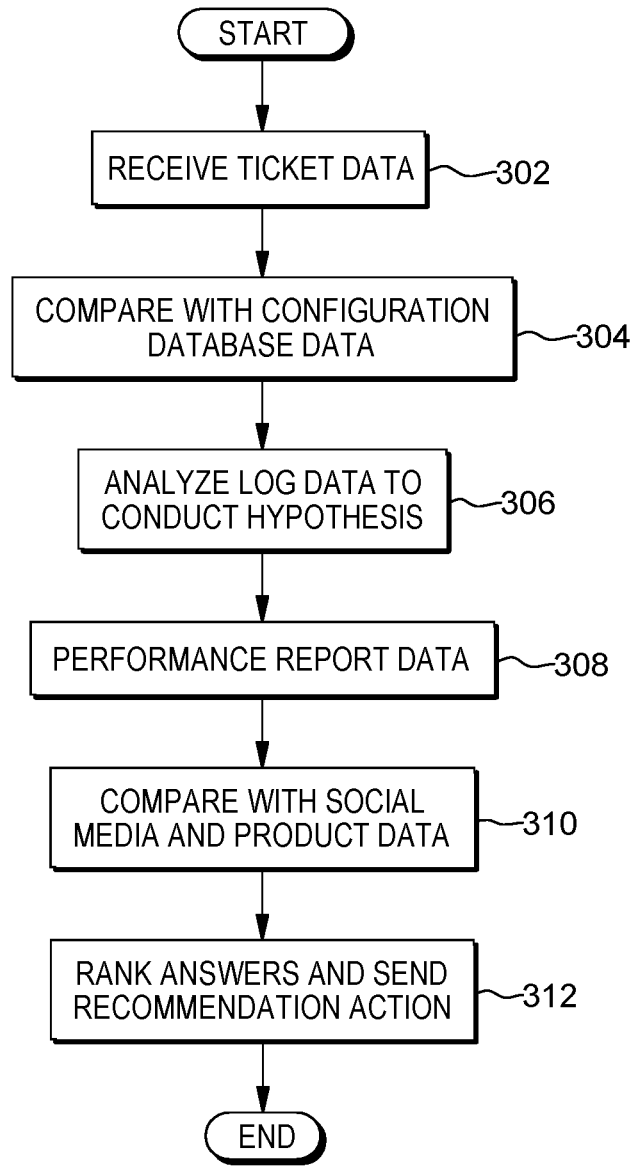
FIG. 3 depicts an example method to provide root cause analysis of technical issues, in accordance with aspects described herein.

An example application of the cognitive method presented herein to address the issue above proceeds as follows. This is depicted in FIG. 3 as an example method to provide root cause analysis of technical issues, in accordance with aspects described herein:

Initially, the method receives ticket data (302) referring to a "Sev-1" ticket. Below is an example such ticket:
Ticket Number: 12345
Asset: SRVMQ001
Support Queue: MQ_SUpport)
Description: Queue Manager XPTO1 is down
Application: Financial System The method continues by comparing the ticket data with configuration management database (CMDB) information to identify the server configuration and the components (304). The CMDB indicates for asset SRVMQ001:
  OS Level: Server OS Version 7.1
  Platform: Hardware Architecture
  CPU(s): 4
  Memory: 16 GB
  Disk: 256 GB
  Software: Application and Integration Middleware version 18.0.2

The method analyzes the log/error data from the monitoring tool to build hypotheses about the technical issue (306). For instance, a search is performed for a string with syntax: error, XPTO1, Down into /var/qm/logs /var/qm/ errors The method checks the performance report(s) created for the server (308), which in this example indicates CPU usage=35%, memory usage=4096 GB, and disk used=33%.

The method continues by checking/comparing with social media and product data (310), for instance the OS and Queue Manager product documentation to identify recommended configurations, and tech forums and social media for similar issues. As one example, a search is performed in a product knowledgebase for a recommended configuration for 'Queue Manager 18.0.2 Server OS 7.1' and a document is found that identifies Queue Manager Release 18.1 as recommended for Server OS version 7.1. Additionally or alternatively, in another example, forums/social media are searched for 'Queue Manager 18.0.2 Server OS issue error down' and the Queue Manager software community reports issues related to Server OS kernel parameters for Queue Manager v. 18.0.2 on the middleware, and recommends to tweak kernel parameters according to the middleware installation guide. One or more potential, and not mutually exclusive, actions may be suggested based on these results.

The method ranks these 'answers', comparing them to collected data to determine applicability, if necessary, and sends a notification with recommended action(s) (312). The recommended action here could be to review and adjust kernel parameters according to what is indicated in the middleware installation guide. Additionally or alternatively, for future upgrades to the Queue Manager or Application and Integration Middleware, there may be a recommendation to review current and recommended parameters.

Aspects described herein differ from other approaches that are directed to root cause determination but fail to apply a cognitive method as described herein, also doing so for predictive analysis and determination of expected technical issues (that are not currently occurring but are expected to), and optionally interacting with other tools to initiate measures to fix the condition in order to prevent the error and maintain normal functionality. Aspects can use the cognitive method to perform RCA and take automatic actions on the basis of predicted expected technical issues, where the cognitive method learns continuously based on assessing experienced issues and triggers of those issues.

Figure 4:
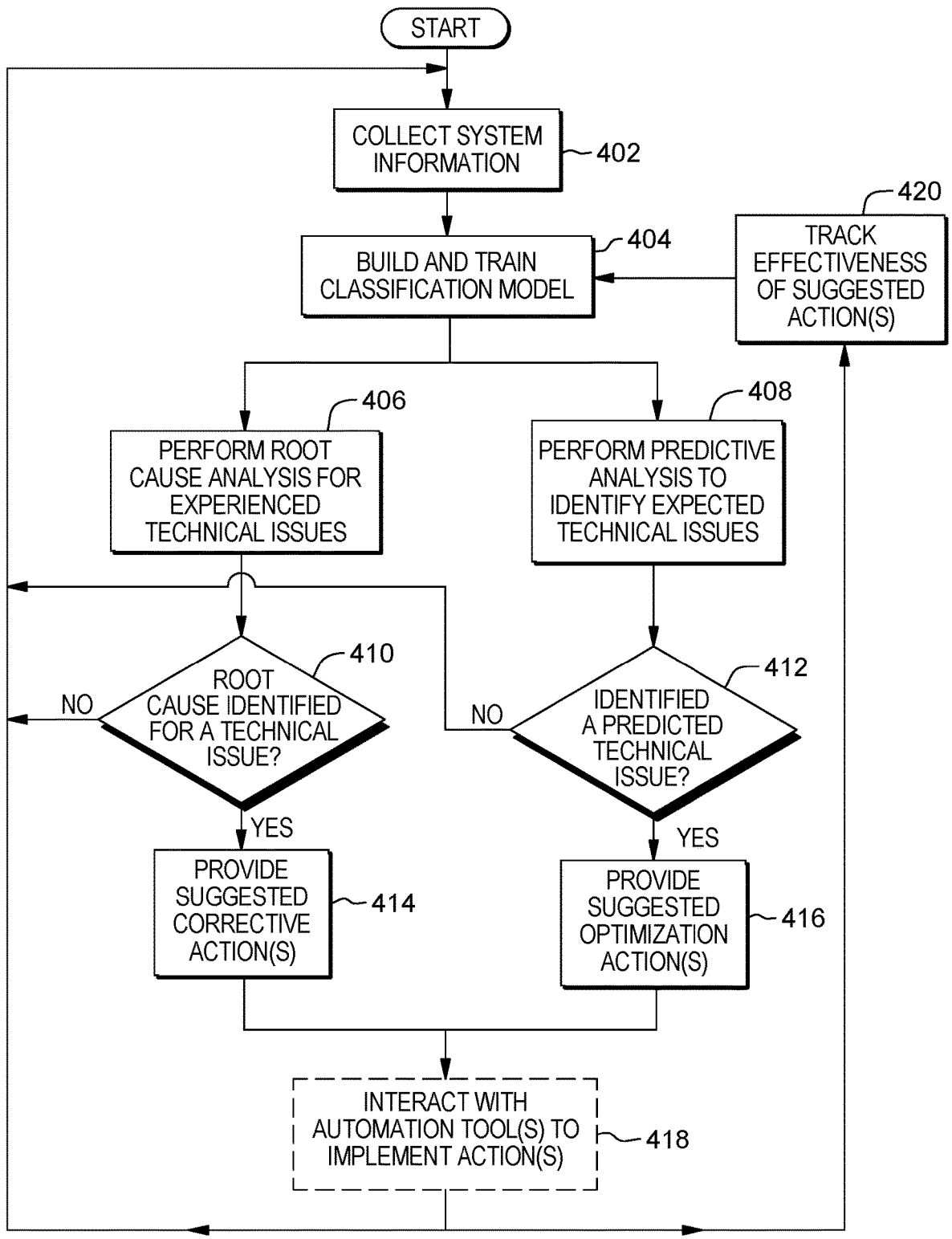
FIG. 4 depicts an example process for providing root cause analysis and predictive analysis for technical issues in a computing environment, in accordance with aspects described herein.

FIG. 4 depicts an example process for providing root cause analysis and predictive analysis for technical issues in a computing environment, in accordance with aspects described herein. In some examples, the process is performed by one or more computer systems, such as those described herein, which may include one or more computer systems executing the cognitive method described above, and/or one or more other computer systems. In a particular example, two or more computer systems each execute respective aspects of FIG. 4.

The process collects information about multiple systems of a computing environment (402). The collected information includes information from any of various sources, such as environmental tools of the computing environment and web sources. Example environmental tools include: (i) ticketing systems providing ticket data as part of the collected information, the ticket data indicating issues experienced by the multiple systems of the computing environment, (ii) monitoring tools providing event data as part of the collected information, the event data including events raised by the multiple systems of the computing environment, and (iii) performance tools providing performance data as part of the collected information, the performance data indicating performance of the multiple systems of the computing environment.

The collected information, for instance information from the web sources, can include product documentation and/or technical papers pertaining the multiple systems. Additionally or alternatively, the collected information includes public data in the form of contributions to product or other technical forums, and social media posts pertaining to the multiple systems. In some embodiments, product documentation, technical papers, and public data inform recommended configurations for the computing environment (e.g. components thereof) and/or known issues with other configurations for the computing environment.

The process builds and trains, via machine learning, a classification model that extracts from the collected information relevant information that classifies technical issues of the computing environment (404). The extraction can be based in part on natural language processing of at least a portion of the collected information, for instance to automatically interpret meaning of collected information that is expressed in natural language (e.g. English, etc., as opposed to computer language, such as code).

The process performs root cause analysis using this built and trained classification model to identify root causes of experienced technical issues experienced by the multiple systems of the computing environment (406). The root cause analysis can use the classification model to extract relevant information, of the collected information, about the experienced technical issues and determine the root causes of the experienced technical issues based on correlations of those extracted relevant information to prior-identified technical issues. Thus, the model may be a classifier that accepts input data and extracts, based on the model being trained with collected historical data, the relevant features of that input data that suggest a particular conclusion about the data, for example suggests a root cause of a technical issue. In some situations, there are different possibilities for what causes the technical issue and how to correct it. Performing the root cause analysis in these situations can include ranking candidate issue-solution combinations based on their relevance to the extracted relevant information about the experienced technical issue. Ranking may be performed using a confidence level, indicated by the model, that the root cause of the experienced technical issue and corrective actions to address that cause are accurately reflected by the issue-solution combination.

What is identified as the root cause of an experienced technical issue may be the identified issue of the highest-ranked issue-solution combination. Each such ranking of candidate issue-solution combinations can provide, for an experienced technical issue, a ranking of candidate root causes and, for each candidate root cause, correlated corrective action(s) to address the root cause.

In addition to RCA performed for experienced technical issues, the process of FIG. 4 also performs predictive analysis using the classification model to identify predicted technical issues (408) that are not occurring at a current time (i.e. at a time of performing the predictive analysis) but are expected to occur in the computing environment in the future based on current states of the multiple systems. Performing this predictive analysis can also include ranking candidate issue-solution combinations based on their relevance to extracted relevant information about an identified predicted technical issue. Each such ranking of candidate issue-solution combinations can provide, for a predicted technical issue, a ranking of candidate optimization actions to prevent the predicted technical issue.

The process makes a determination (410) as to whether the RCA identified a root causes of an experienced technical issue. If so, the process provides suggested corrective actions (414) to perform against at least one system, of the multiple systems, to which the experienced technical issues relate. The corrective actions may be selected automatically by the classification model, based on its training and learning, to target and correctively address the identified root cause of the experienced technical issues. The corrective actions may the solution(s) of the highest ranked issue-solution combination, for instance.

Similarly with respect to the predictive analysis, the process makes a determination (412) as to whether the predictive analysis identified a predicted technical issue. If so, the process provides suggested optimization actions (416) to perform against at least one system, of the multiple systems, to which the predicted technical issue relates. The corrective actions may be selected automatically by the classification model, based on identifying past actions, and effectiveness thereof, taken to prevent issues in the computing environment. These suggested actions can be for preventative optimization to prevent experiencing the predicted technical issue at a future time. Here too, the corrective actions may the solution(s) of the highest ranked issue-solution combination, for instance.

The process proceeds to an optional aspect of automatically implementing some or all of the corrective or suggested actions by interacting with one or more automation tools of the environment to define and perform tasks that implement the corrective/optimization actions (418). In some embodiments, it may be desired to implement actions automatically. In other embodiments, it may be desired that an administrator or other user control the implementation of suggested actions.

The method proceeds by returning the 402 to continue with further information collection and procession through the rest of the process. Thus, the information collection, training of the model, RCA and predictive analyses, and action suggestion aspects are performed as an ongoing process. To refine the model over time, the process also tracks effectiveness of the suggested corrective actions in correcting the root causes of the experienced technical issues and of the suggested optimization actions in preventing the predicted technical issues (420). It performs this tracking in any desired manner, for instance by observing via collected information (402) whether the technical issues remain and/or by prompting administrators or other users to indicate the effectiveness of actions. The results of this tracking are fed the training process (404) to further train the classification model.

An aspect described above ranks the candidate issue-solution combinations. A provided suggested corrective action for an experienced technical issue (discussed with reference to 410) may be selected as the highest-ranked candidate corrective action, and tracking the effectiveness (420) includes tracking, via user feedback, effectiveness of the suggested corrected action at correctively addressing the root cause correlated to the suggested corrective action. If a suggested action does not resolve the technical issue, it may indicate that the action is not effective at addressing the corresponding root cause it was supposed to address. Similarly, a provided suggested optimization action for a predicted technical issue may be selected as the highest-ranked candidate optimization action, where the tracking includes tracking, via user feedback, effectiveness of the suggested optimization action at preventing the predicted technical issue.

Feedback from users can be provided as part of the results fed into the training process (at 420) to further train the classification model in identifying best solutions to identified issues. The user feedback can contribute to ranks of the candidate issue-solution combinations in future rankings. In this manner, the ongoing training provided by the feedback loop can affect the rankings of issue-solution combinations. If a particular solution is found based on user feedback to not properly address a problem, the training can correct this to devalue or eliminate the issue-solution combination. Feedback that a proposed solution successfully addressed a given technical issue might boost the model's confidence that that issue-solution combination accurately addresses the root cause of that technical issue.

Another example of collected information (402) is ticket information that identifies a technical issue. The extracting performed as part of the RCA can include correlating the identified technical issue to configuration management information from the configuration management database, and identifying one or more systems, of the multiple systems, to which the technical issue applies.

In some embodiments, prior to performing the root cause analysis at (406) for an identified experienced technical issue, the process can suggest initial corrective actions as an emergency remediation to mitigate effects of the identified experienced technical issue. The process can then perform the root cause analysis for the identified experienced technical issue in an attempt to determine the root cause of the identified experienced technical issue and identify additional corrective actions, likely ones that ore permanently address the technical issue.

Although various examples are provided, variations are possible without departing from a spirit of the claimed aspects.

Figure 5:
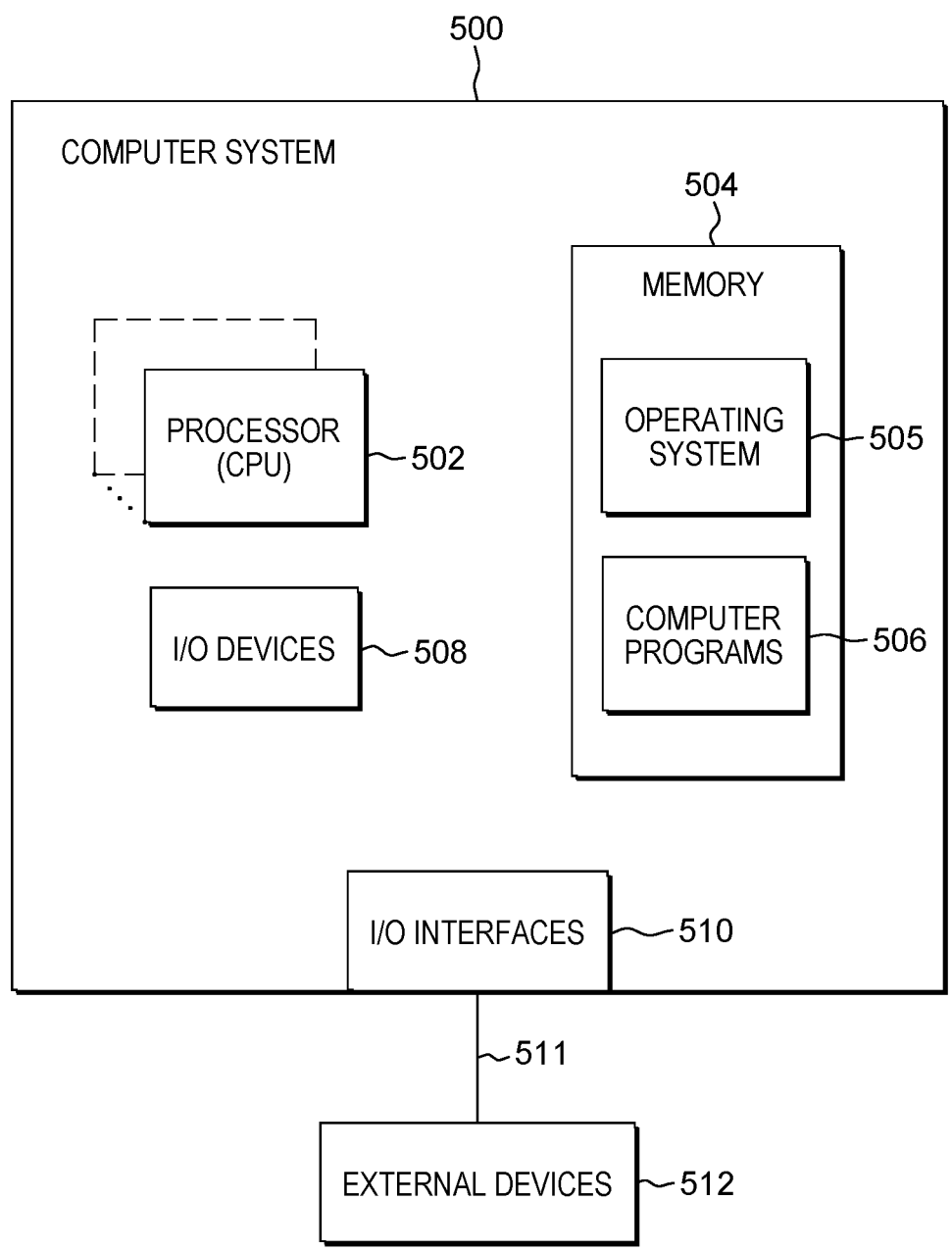
FIG. 5 depicts one example of a computer system and associated devices to incorporate and/or use aspects described herein.

Processes described herein may be performed singly or collectively by one or more computer systems, such as one or more computer systems of a computing environment. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
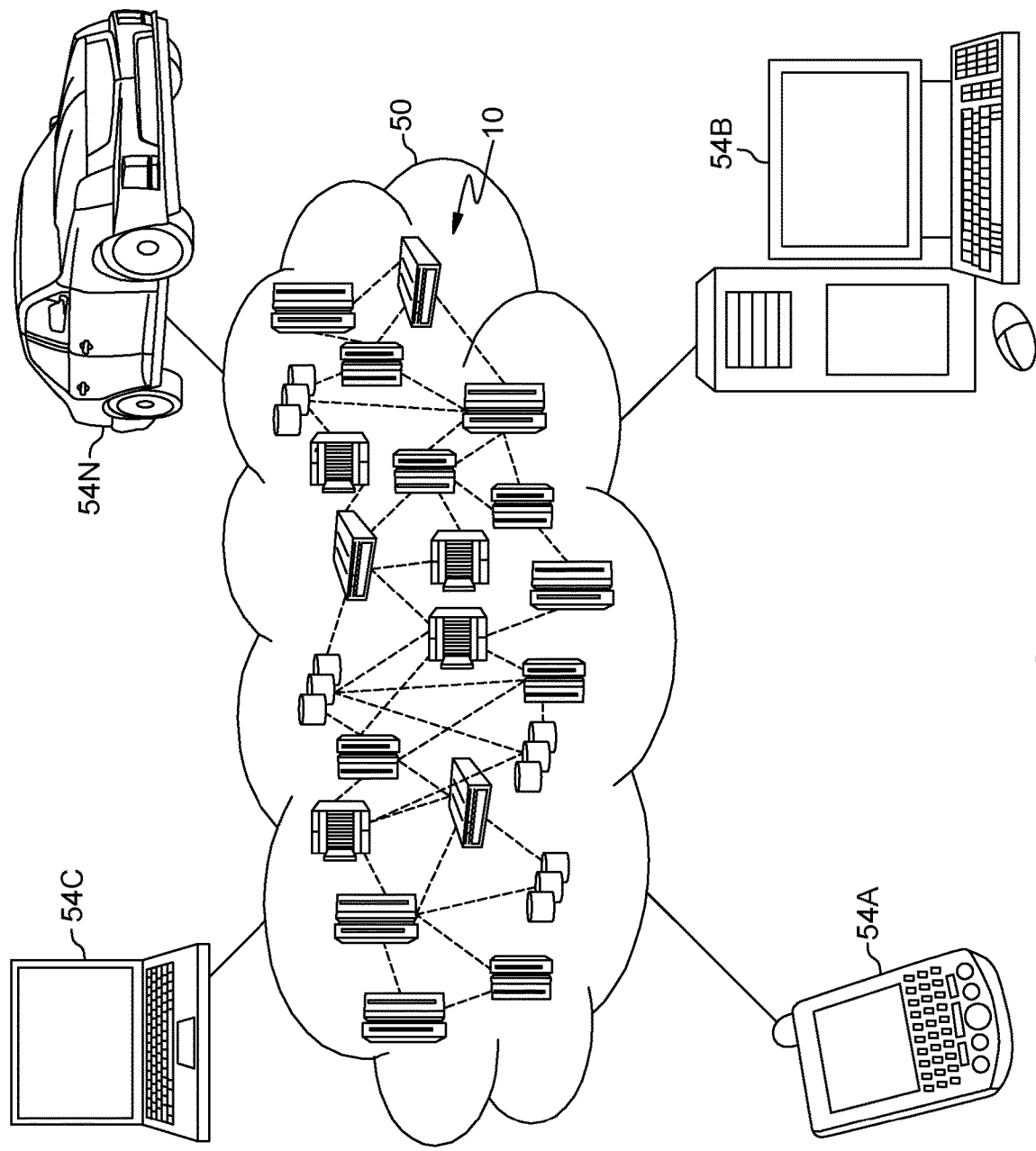
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
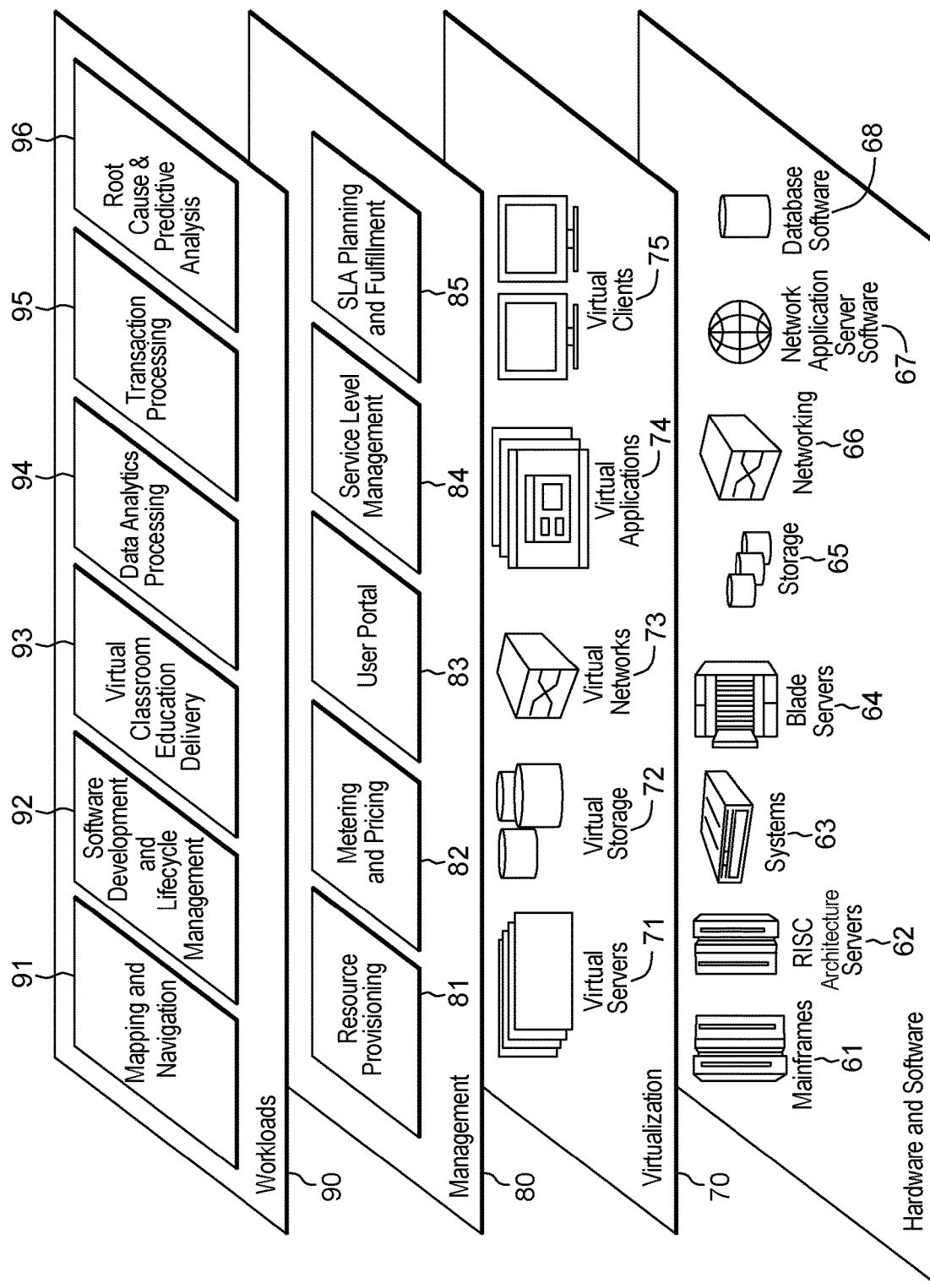
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and root cause and predictive analysis 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    collecting information about multiple systems of a computing environment, the collected information comprising information from environmental tools of the computing environment and information from web sources;
    building and training, via machine learning, a classification model that extracts from the collected information, in part based on natural language processing of at least a portion of the collected information, relevant information that classifies technical issues of the computing environment;
    performing root cause analysis using the classification model and identifying root causes of experienced technical issues experienced by the multiple systems, the root cause analysis using the classification model to extract relevant information, of the collected information, about the experienced technical issues and determine the root causes of the experienced technical issues based on correlations to prior-identified technical issues;
    based on identifying the root causes of the experienced technical issues, providing suggested corrective actions to perform against at least one system, of the multiple systems, to which the experienced technical issues relate, the corrective actions being selected by the classification model to target and correctively address the identified root causes of the experienced technical issues;
    performing predictive analysis using the classification model and identifying predicted technical issues that are not occurring at a current time but are expected to occur in the computing environment in the future based on current states of the multiple systems;
    based on identifying the predicted technical issues, providing suggested optimization actions to perform against at least one system, of the multiple systems, to which the predicted technical issues relate, the suggested optimization actions being selected by the classification model based on identifying past actions, and effectiveness thereof, taken to prevent issues in the computing environment, and the suggested optimization actions being for preventative optimization to prevent experiencing the predicted technical issues; and
    tracking effectiveness of the suggested corrective actions in correcting the root causes of the experienced technical issues and of the suggested optimization actions in preventing the predicted technical issues, and feeding results of the tracking into a training process that further trains the classification model.

2. The method of claim 1, wherein performing the root cause analysis or performing the predictive analysis comprises ranking candidate issue-solution combinations based on their relevance to extracted relevant information about an experienced technical issue or to a predicted technical issue.

3. The method of claim 2, wherein the identified root cause of an experienced technical issue is identified as an issue indicated by a highest-ranked issue-solution combination.

4. The method of claim 2, wherein the ranked candidate issue-solution combinations provide at least one selected from the group comprising:

for an experienced technical issue, a ranking of candidate root causes and, for each candidate root cause, a correlated corrective action to address the root cause, wherein the provided suggested corrective action for the experienced technical issue is selected as the highest-ranked candidate corrective action, and wherein the tracking comprises tracking, via user feedback, effectiveness of the suggested corrected action at correctively addressing the root cause correlated to the suggested corrective action; or for a predicted technical issue, a ranking of candidate optimization actions to prevent the predicted technical issue, wherein the provided suggested optimization action for the predicted technical issue is selected as the highest-ranked candidate optimization action, and wherein the tracking comprises tracking, via user feedback, effectiveness of the suggested optimization action at preventing the predicted technical issue.

5. The method of claim 4, wherein the user feedback is provided as part of the results fed into the training process to further train the classification model in identifying solutions to identified issues, and wherein the user feedback contributes to ranks of the candidate issue-solution combinations in future rankings.

6. The method of claim 1, wherein the building comprises performing the natural language processing against the portion of the collected information to interpret meaning of the portion of the collected information.

7. The method of claim 1, wherein the environmental tools comprise at least one of the group consisting of: (i) ticketing systems providing ticket data as part of the collected information, the ticket data indicating issues experienced by the multiple systems of the computing environment, (ii) monitoring tools providing event data as part of the collected information, the event data comprising events raised by the multiple systems of the computing environment, and (iii) performance tools providing performance data as part of the collected information, the performance data indicating performance of the multiple systems of the computing environment.

8. The method of claim 1, wherein the collected information comprises product documentation and technical papers pertaining the multiple systems, and further comprises public data in the form of contributions to product forums and social media posts pertaining to the multiple systems.

9. The method of claim 8, wherein the product documentation, technical papers, and public data inform recommended configurations for the computing environment and known issues with other configurations for the computing environment.

10. The method of claim 1, wherein the collected information comprises ticket information identifying a technical issue of the experienced technical issues, and wherein the extracting comprises correlating the identified technical issue to configuration management information from a configuration management database and identifying one or more systems, of the multiple systems, to which the technical issue applies.

11. The method of claim 1, further comprising, for an identified experienced technical issue, suggesting initial corrective actions as an emergency remediation to mitigate effects of the identified experienced technical issue, and performing the root cause analysis for the identified experienced technical issue in an attempt to determine the root cause of the identified experienced technical issue and identify additional corrective actions.

12. The method of claim 1, further comprising interacting with one or more automation tools of the environment to define and perform tasks to implement the corrective actions and optimization actions.

13. A computer system comprising:

a memory; and a processor in communication with the memory, wherein the computer system is configured to perform a method comprising:

collecting information about multiple systems of a computing environment, the collected information comprising information from environmental tools of the computing environment and information from web sources;

building and training, via machine learning, a classification model that extracts from the collected information, in part based on natural language processing of at least a portion of the collected information, relevant information that classifies technical issues of the computing environment;

performing root cause analysis using the classification model and identifying root causes of experienced technical issues experienced by the multiple systems, the root cause analysis using the classification model to extract relevant information, of the collected information, about the experienced technical issues and determine the root causes of the experienced technical issues based on correlations to prior-identified technical issues;

based on identifying the root causes of the experienced technical issues, providing suggested corrective actions to perform against at least one system, of the multiple systems, to which the experienced technical issues relate, the corrective actions being selected by the classification model to target and correctively address the identified root causes of the experienced technical issues;

performing predictive analysis using the classification model and identifying predicted technical issues that are not occurring at a current time but are expected to occur in the computing environment in the future based on current states of the multiple systems;

based on identifying the predicted technical issues, providing suggested optimization actions to perform against at least one system, of the multiple systems, to which the predicted technical issues relate, the suggested optimization actions being selected by the classification model based on identifying past actions, and effectiveness thereof, taken to prevent issues in the computing environment, and the suggested optimization actions being for preventative optimization to prevent experiencing the predicted technical issues; and tracking effectiveness of the suggested corrective actions in correcting the root causes of the experienced technical issues and of the suggested optimization actions in preventing the predicted technical issues, and feeding results of the tracking into a training process that further trains the classification model.

14. The computer system of claim 13, wherein performing the root cause analysis or performing the predictive analysis comprises ranking candidate issue-solution combinations based on their relevance to extracted relevant information about an experienced technical issue or to a predicted technical issue.

15. The computer system of claim 14, wherein the ranked candidate issue-solution combinations provide at least one selected from the group comprising:
  for an experienced technical issue, a ranking of candidate root causes and, for each candidate root cause, a correlated corrective action to address the root cause, wherein the provided suggested corrective action for the experienced technical issue is selected as the highest-ranked candidate corrective action, and wherein the tracking comprises tracking, via user feedback, effectiveness of the suggested corrected action at correctively addressing the root cause correlated to the suggested corrective action; or
  for a predicted technical issue, a ranking of candidate optimization actions to prevent the predicted technical issue, wherein the provided suggested optimization action for the predicted technical issue is selected as the highest-ranked candidate optimization action, and wherein the tracking comprises tracking, via user feedback, effectiveness of the suggested optimization action at preventing the predicted technical issue.

16. The computer system of claim 13, wherein the building comprises performing the natural language processing against the portion of the collected information to interpret meaning of the portion of the collected information.

17. The computer system of claim 13, wherein the environmental tools comprise at least one of the group consisting of: (i) ticketing systems providing ticket data as part of the collected information, the ticket data indicating issues experienced by the multiple systems of the computing environment, (ii) monitoring tools providing event data as part of the collected information, the event data comprising events raised by the multiple systems of the computing environment, and (iii) performance tools providing performance data as part of the collected information, the performance data indicating performance of the multiple systems of the computing environment.

18. The computer system of claim 13, wherein the collected information comprises product documentation and technical papers pertaining the multiple systems, and further comprises public data in the form of contributions to product forums and social media posts pertaining to the multiple systems.

19. A computer program product comprising:
  a computer readable storage medium readable by a processing circuit and storing instructions for execution by the processing circuit for performing a method comprising:
    collecting information about multiple systems of a computing environment, the collected information comprising information from environmental tools of the computing environment and information from web sources;
    building and training, via machine learning, a classification model that extracts from the collected information, in part based on natural language processing of at least a portion of the collected information, relevant information that classifies technical issues of the computing environment;
    performing root cause analysis using the classification model and identifying root causes of experienced technical issues experienced by the multiple systems, the root cause analysis using the classification model to extract relevant information, of the collected information, about the experienced technical issues and determine the root causes of the experienced technical issues based on correlations to prior-identified technical issues;
    based on identifying the root causes of the experienced technical issues, providing suggested corrective actions to perform against at least one system, of the multiple systems, to which the experienced technical issues relate, the corrective actions being selected by the classification model to target and correctively address the identified root causes of the experienced technical issues;
    performing predictive analysis using the classification model and identifying predicted technical issues that are not occurring at a current time but are expected to occur in the computing environment in the future based on current states of the multiple systems;
    based on identifying the predicted technical issues, providing suggested optimization actions to perform against at least one system, of the multiple systems, to which the predicted technical issues relate, the suggested optimization actions being selected by the classification model based on identifying past actions, and effectiveness thereof, taken to prevent issues in the computing environment, and the suggested optimization actions being for preventative optimization to prevent experiencing the predicted technical issues; and
    tracking effectiveness of the suggested corrective actions in correcting the root causes of the experienced technical issues and of the suggested optimization actions in preventing the predicted technical issues, and feeding results of the tracking into a training process that further trains the classification model.

20. The computer program product of claim 19, wherein the building comprises performing the natural language processing against the portion of the collected information to interpret meaning of the portion of the collected information.

* * * * *